(12) United States Patent
Loveless et al.

(10) Patent No.: US 8,561,512 B2
(45) Date of Patent: Oct. 22, 2013

(54) CUTOFF SAW AND STAND WITH INTEGRATED DUST FILTRATION SYSTEM

(75) Inventors: Spencer Loveless, Price, UT (US); Kyle Alan Bjork, Buffalo, MN (US)

(73) Assignee: Dustless Depot LLC, Price, UT (US)

( * ) Notice: Subject to any disclaimer, the term of this patent is extended or adjusted under 35 U.S.C. 154(b) by 390 days.

(21) Appl. No.: 12/858,397

(22) Filed: Aug. 17, 2010

(65) Prior Publication Data

US 2011/0192262 A1  Aug. 11, 2011

Related U.S. Application Data

(60) Provisional application No. 61/234,838, filed on Aug. 18, 2009.

(51) Int. Cl.
*B26D 7/06* (2006.01)
*B26D 7/08* (2006.01)

(52) U.S. Cl.
USPC .............................................. 83/168; 83/100

(58) Field of Classification Search
USPC .................. 83/98, 100, 168–170, 477–477.2, 83/471.3, 473, 490, 581; 144/252.1; 451/453, 456; 125/13.03
See application file for complete search history.

(56) References Cited

U.S. PATENT DOCUMENTS

| | | |
|---|---|---|
| 907,734 A | 12/1908 | Butterfield |
| 1,123,562 A | 1/1915 | Lund |
| RE15,262 E | 1/1922 | Gurgel |
| 1,643,882 A | 9/1927 | Faiver |
| 2,032,382 A | 3/1936 | Torrison |
| 2,041,689 A | 5/1936 | Baumeister |
| 2,279,186 A | 4/1942 | Terry et al. |
| 2,291,269 A | 7/1942 | Wiggleworth |
| 2,294,272 A * | 8/1942 | Boice .......................... 83/471.3 |
| 2,384,688 A * | 9/1945 | Litman ........................ 451/456 |
| 2,503,854 A | 4/1950 | Trainor |
| 2,520,725 A | 8/1950 | Robert et al. |
| 2,803,098 A | 8/1957 | Robert et al. |
| 2,819,570 A | 1/1958 | Guilbert et al. |
| 2,819,571 A | 1/1958 | Morgan |
| 2,994,995 A | 8/1961 | Griffith |
| 3,166,877 A | 1/1965 | Reames |
| 3,256,648 A | 6/1966 | Subonovich |
| 3,468,076 A | 9/1969 | Jones |
| 3,667,170 A | 6/1972 | MacKay |
| 3,673,744 A | 7/1972 | Oimoen |
| 3,835,543 A | 9/1974 | Polydoris et al. |
| 3,848,686 A | 11/1974 | Jysky et al. |
| 3,862,521 A | 1/1975 | Isaksson |
| 3,882,598 A | 5/1975 | Earle et al. |
| 3,882,644 A | 5/1975 | Cusumano |

(Continued)

FOREIGN PATENT DOCUMENTS

| | | |
|---|---|---|
| EP | 556713 | 8/1993 |
| EP | 0 579 964 | 1/1994 |

(Continued)

*Primary Examiner* — Ghassem Alie
*Assistant Examiner* — Bharat C Patel
(74) *Attorney, Agent, or Firm* — Pate Peterson PLLC; Brett Peterson (57) ABSTRACT

A cutoff saw and filtration system provides convenient multi-stage filtration for a cutoff saw. The filters are effective in capturing the dust and debris created by the saw without becoming clogged. The filters may be easily cleaned and serviced.

19 Claims, 7 Drawing Sheets

(56) References Cited

U.S. PATENT DOCUMENTS

| | | | |
|---|---|---|---|
| 3,945,281 A | 3/1976 | Kreitz | |
| 3,987,589 A | 10/1976 | Marton | |
| 4,063,478 A | 12/1977 | Stuy | |
| 4,090,297 A | 5/1978 | Wanner et al. | |
| 4,135,334 A | 1/1979 | Rudiger | |
| 4,201,256 A * | 5/1980 | Truhan | 144/252.2 |
| 4,253,362 A | 3/1981 | Olson | |
| 4,326,864 A * | 4/1982 | Sittler | 55/364 |
| 4,367,665 A * | 1/1983 | Terpstra et al. | 83/100 |
| 4,381,628 A | 5/1983 | Dicke | |
| 4,400,995 A | 8/1983 | Palm | |
| 4,574,532 A | 3/1986 | Haberle et al. | |
| 4,576,072 A * | 3/1986 | Terpstra et al. | 83/102.1 |
| 4,622,782 A | 11/1986 | Roestenberg | |
| 4,697,389 A | 10/1987 | Romine | |
| 4,761,877 A | 8/1988 | Rupp | |
| 4,782,632 A | 11/1988 | Matechuk | |
| 4,868,949 A | 9/1989 | Loveless et al. | |
| 4,921,375 A | 5/1990 | Famulari | |
| 4,932,163 A | 6/1990 | Chilton et al. | |
| 4,932,164 A | 6/1990 | Sullivan et al. | |
| 5,033,552 A | 7/1991 | Hu | |
| 5,074,044 A | 12/1991 | Duncan et al. | |
| 5,084,972 A | 2/1992 | Waugh | |
| 5,105,585 A | 4/1992 | Hampl et al. | |
| 5,125,190 A | 6/1992 | Buser et al. | |
| 5,131,192 A | 7/1992 | Cheng | |
| 5,163,252 A | 11/1992 | Garner et al. | |
| 5,167,215 A | 12/1992 | Harding, Jr. | |
| 5,176,408 A | 1/1993 | Pedersen | |
| 5,201,785 A | 4/1993 | Nagano | |
| 5,237,781 A | 8/1993 | Demetrius | |
| 5,327,649 A | 7/1994 | Skinner | |
| 5,339,571 A | 8/1994 | Timmons et al. | |
| 5,411,433 A | 5/1995 | Keller | |
| 5,435,066 A | 7/1995 | Bare | |
| 5,440,809 A | 8/1995 | Padilla | |
| 5,445,056 A * | 8/1995 | Folci | 83/100 |
| 5,545,082 A | 8/1996 | Courson et al. | |
| 5,558,571 A | 9/1996 | Toyoshima et al. | |
| 5,564,408 A | 10/1996 | Bassols | |
| 5,566,457 A | 10/1996 | Batschari et al. | |
| 5,575,035 A | 11/1996 | Reis et al. | |
| 5,582,225 A * | 12/1996 | Schank | 144/286.1 |
| 5,588,213 A | 12/1996 | Swanberg | |
| 5,609,516 A | 3/1997 | Courson et al. | |
| 5,653,561 A | 8/1997 | May | |
| 5,675,895 A | 10/1997 | Mori et al. | |
| 5,688,082 A | 11/1997 | Richardson | |
| 5,704,956 A | 1/1998 | Loveless et al. | |
| 5,713,785 A | 2/1998 | Nishio | |
| D392,531 S | 3/1998 | Richardson | |
| 5,774,992 A | 7/1998 | Lindenmuth | |
| 5,791,979 A | 8/1998 | Duncan et al. | |
| 5,816,733 A | 10/1998 | Ishikawa et al. | |
| 5,819,619 A * | 10/1998 | Miller et al. | 83/100 |
| 5,931,072 A | 8/1999 | Shibata | |
| 5,954,863 A | 9/1999 | Loveless et al. | |
| 6,027,399 A | 2/2000 | Stewart | |
| 6,053,674 A | 4/2000 | Thompson | |
| 6,108,912 A | 8/2000 | Radigan | |
| 6,138,317 A | 10/2000 | Holmes et al. | |
| 6,167,626 B1 | 1/2001 | Doumani et al. | |
| 6,183,527 B1 * | 2/2001 | O'Banion et al. | 55/385.1 |
| 6,219,922 B1 | 4/2001 | Campbell et al. | |
| 6,273,081 B1 | 8/2001 | Gorgol et al. | |
| 6,318,352 B1 | 11/2001 | Gnazzo et al. | |
| 6,347,985 B1 | 2/2002 | Loveless | |
| 6,470,778 B1 * | 10/2002 | Kaye et al. | 83/100 |
| 6,471,574 B1 | 10/2002 | Rupprecht et al. | |
| 6,557,261 B1 | 5/2003 | Buser et al. | |
| 6,648,742 B1 | 11/2003 | Segiel, Jr. | |
| 6,679,145 B1 | 1/2004 | Lee | |
| 6,699,114 B1 | 3/2004 | Booeshaghi et al. | |
| 6,726,554 B1 | 4/2004 | Chen et al. | |
| 6,748,660 B2 * | 6/2004 | Buser et al. | 125/12 |
| 6,796,208 B1 | 9/2004 | Jorgensen | |
| 6,811,476 B2 | 11/2004 | Ohlendorf | |
| 6,823,907 B2 | 11/2004 | Cheng | |
| 6,860,799 B2 | 3/2005 | Loveless | |
| 6,878,050 B2 | 4/2005 | Wendt et al. | |
| 6,886,441 B2 * | 5/2005 | Hamilton | 83/478 |
| 6,896,605 B2 | 5/2005 | Ohlendorf | |
| 6,902,594 B2 | 6/2005 | Cho | |
| 6,935,939 B1 | 8/2005 | Buser et al. | |
| 6,948,412 B2 | 9/2005 | Brazell et al. | |
| 6,960,124 B2 | 11/2005 | Lee | |
| 7,013,884 B2 * | 3/2006 | Guth | 125/13.01 |
| 7,044,039 B2 * | 5/2006 | Powell | 83/100 |
| 7,044,843 B1 * | 5/2006 | Lin | 451/178 |
| 7,047,647 B1 | 5/2006 | Muller | |
| 7,047,650 B2 | 5/2006 | Chen | |
| 7,069,831 B2 * | 7/2006 | Chang | 83/100 |
| 7,171,880 B2 | 2/2007 | Powell | |
| 7,195,429 B2 | 3/2007 | Dods et al. | |
| 7,197,826 B2 | 4/2007 | Baxivanelis | |
| 7,198,559 B2 | 4/2007 | Walstrum et al. | |
| 7,204,178 B2 * | 4/2007 | Bergmann | 83/162 |
| 7,216,572 B2 * | 5/2007 | Keenan | 83/100 |
| 7,222,560 B2 | 5/2007 | Parks et al. | |
| 7,223,161 B2 | 5/2007 | Kodani et al. | |
| 7,300,337 B1 | 11/2007 | Sun et al. | |
| 7,438,633 B2 | 10/2008 | Jespersen | |
| 7,578,063 B2 | 8/2009 | Martin | |
| 7,625,265 B2 | 12/2009 | Woods et al. | |
| 7,635,293 B2 | 12/2009 | Sun et al. | |
| 7,661,195 B1 | 2/2010 | Wood | |
| 7,740,086 B2 | 6/2010 | Bleicher et al. | |
| 7,887,624 B2 | 2/2011 | Ekstrom et al. | |
| 7,892,075 B2 | 2/2011 | Esenwein | |
| 7,985,042 B1 | 7/2011 | Paxton | |
| 2004/0206220 A1 * | 10/2004 | Keenan | 83/100 |
| 2005/0088866 A1 | 4/2005 | Levine | |
| 2005/0155233 A1 | 7/2005 | Chen | |
| 2006/0005681 A1 * | 1/2006 | Lambert et al. | 83/471.3 |
| 2006/0019585 A1 | 1/2006 | Zayat et al. | |
| 2006/0266184 A1 * | 11/2006 | Hetcher et al. | 83/471.3 |
| 2007/0079589 A1 | 4/2007 | Ekstrom et al. | |
| 2007/0155296 A1 | 7/2007 | Hofmann et al. | |
| 2007/0178815 A1 | 8/2007 | Buser | |
| 2007/0193759 A1 | 8/2007 | Sweig et al. | |
| 2007/0251104 A1 | 11/2007 | Heinrichs | |
| 2008/0053282 A1 * | 3/2008 | Chen | 83/162 |
| 2008/0060631 A1 | 3/2008 | Dofher | |
| 2008/0099053 A1 | 5/2008 | Loveless | |
| 2008/0109986 A1 | 5/2008 | Loveless | |
| 2008/0163492 A1 * | 7/2008 | Johansson | 30/124 |
| 2008/0200103 A1 | 8/2008 | Esenwein | |
| 2008/0271323 A1 | 11/2008 | Perlmutter | |
| 2009/0181604 A1 | 7/2009 | Loveless | |
| 2009/0181605 A1 | 7/2009 | Loveless | |
| 2009/0181606 A1 | 7/2009 | Loveless | |
| 2009/0183377 A1 | 7/2009 | Loveless | |
| 2009/0183800 A1 | 7/2009 | Loveless | |
| 2009/0186559 A1 | 7/2009 | Loveless | |
| 2009/0311953 A1 | 12/2009 | Maute et al. | |

FOREIGN PATENT DOCUMENTS

| | | |
|---|---|---|
| GB | 2 260 721 | 4/1993 |
| JP | 10-000559 | 1/1998 |
| KR | 10-2002-0056086 | 7/2002 |

\* cited by examiner

CUTOFF SAW AND STAND WITH INTEGRATED DUST FILTRATION SYSTEM

PRIORITY

The present application claims the benefit of U.S. Provisional Application Ser. No. 61/234,838, filed Aug. 18, 2009, which is herein incorporated by reference in its entirety.

THE FIELD OF THE INVENTION

The present invention relates to dust collection. More specifically, the present invention relates to a cutoff saw and stand with an integrated dust collection system.

BACKGROUND

Dust collection has become increasingly important while cutting materials such as wood, brick or cement, or while performing other similar tasks. Without a dust shroud, debris is typically scattered over a wide area. It is desirable to contain the dust which is created for several reasons. It is desirable to contain the dust and debris to keep the workplace cleaner and to minimize the time necessary to clean up afterwards. While cutting cement or brick, for example, fine dust is often created which is spread over a large distance and can be quite difficult to clean up afterwards. It is also desirable to contain the dust and debris to keep the same from getting into the tool itself, as the fine dust will causing premature failure of the bearings, motor, etc. Additionally, debris such as concrete or brick dust poses a health risk to the machine operator and others who may breathe it. It is thus desirable to collect the dust to minimize any exposure to the dust.

Cutoff saws are often used for cutting wood, tile or brick during construction projects. As discussed above, it is desirable to contain the dust to reduce cleanup and tool wear as well as avoiding health issues. Where the tool is used in a finished home or building, such as when performing a repair or a remodel of the location, it is often required to contain the dust so as to avoid damage to the finished building and the items in the building. Cutoff saws, however, have proven difficult to effectively capture the dust. The use of the cutoff saw typically requires that a fairly large portion of the blade is exposed, making dust collection more difficult. The dust collection device can not obscure the blade and interfere with the use of the saw. Additionally, the blade is usually a large diameter and moves at a high speed and tends to forcefully disperse the dust from the tool, making dust collection more difficult. Moreover, the fine dust created when cutting with a cutoff saw has proven a difficulty because the filters are quickly clogged, subsequently reducing the airflow through the dust collector and thereby reducing the effectiveness in capturing the dust.

Previous attempts at collecting dust from a cutoff saw have been unsatisfactory. Many of these simply do not adequately collect the dust and debris. Those that initially capture the dust will quickly become clogged with dust and lose effectiveness.

Thus there is a need for a cutoff saw which effectively captures the cutting dust and debris. There is a need for a dust collection device which does not interfere with the use of the saw. There is a need for a device which captures dust without quickly losing efficiency, and which has a filter which is easily cleaned or renewed.

SUMMARY OF THE INVENTION

It is an object of the present invention to provide an improved cutoff saw and dust collection system.

According to one aspect of the invention, a cutoff saw is provided which includes a dust collection system integral to the base of the saw. The dust collection system draws air through the table around the blade and effectively captures the dust which is generated.

According to another aspect of the invention, a cutoff saw is provided which has a dust collection system which does not clog quickly. The dust collection system may utilize both a filtration bag and a canister filter, greatly increasing the available filtration surface area. Such a filter arrangement allows the system to capture a significant amount of dust and debris without becoming clogged with dust and experiencing a significant reduction in airflow through the system.

According to another aspect of the invention, a cutoff saw is provided which has a dust collection system with easily renewable filters. The system is provided with a filtration bag that is attached to a drawer which forms part of the cutoff saw base. The filtration bag is automatically connected to the dust collection shroud when the drawer is closed. Additionally, a canister filter is provided which further filters the air flowing out of the filter bag. The canister filter is not frequently removed from the base. A spring actuated impact rod is mounted through the base adjacent the canister filter. The rod end outside of the base is pulled by the operator and released, causing the inside end of the rod to hit the canister filter and knock dust off of the filter. This allows a user to renew the filter quickly and without removing the filter from the base.

These and other aspects of the present invention are realized in a cutoff saw and dust collection system as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
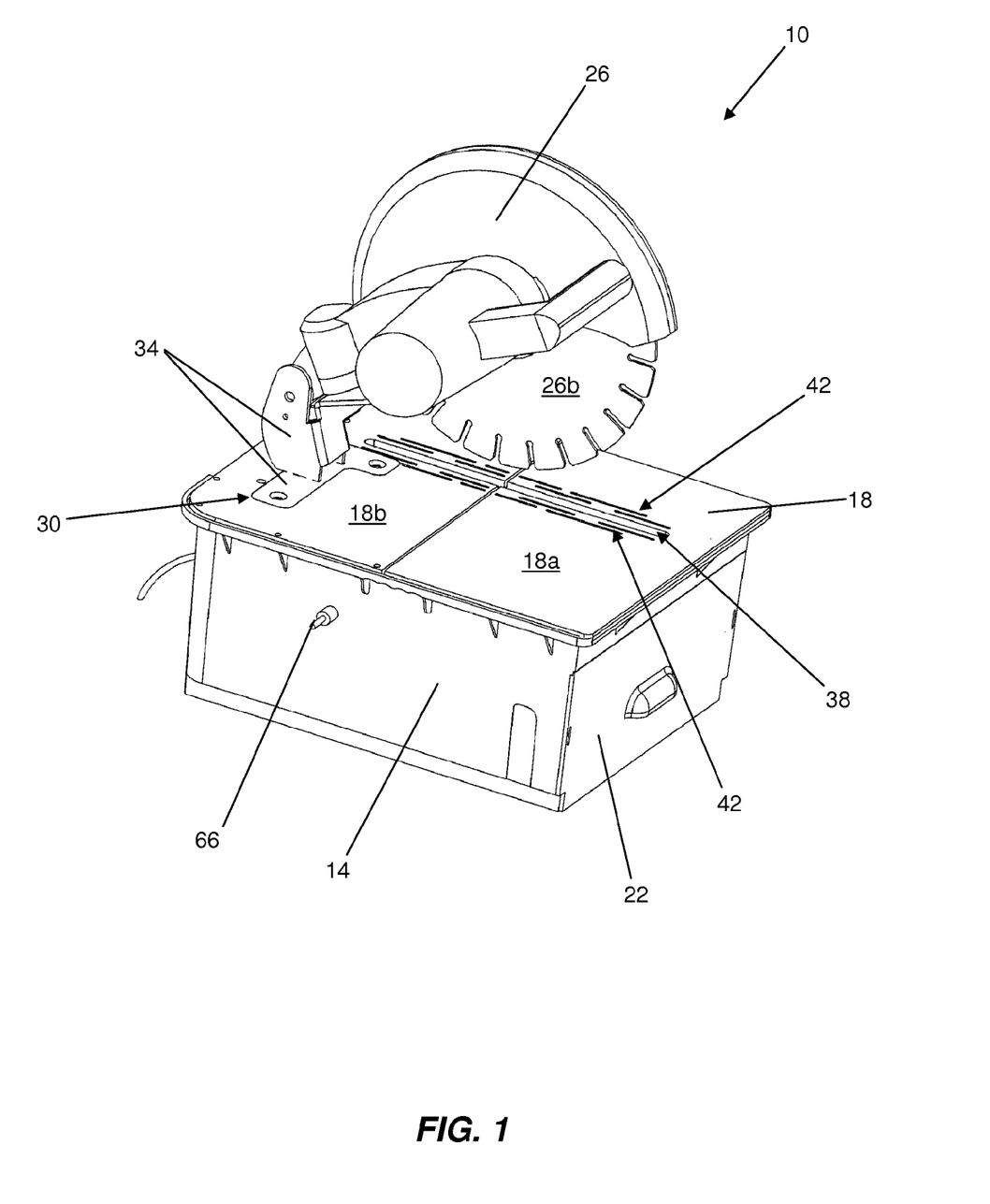
FIG. 1 shows a perspective view of a cutoff saw according to the present invention.

Turning now to FIG. 1, a perspective view of a cutoff saw according to the present invention is shown. The saw 10 includes a base 14, table 18, a filter drawer 22, and a saw motor assembly 26 with blade 26b. The saw motor assembly typically includes an arm extending forwards, a motor, a blade guard, and a blade 26b. The table 18 is formed with a front section 18a and a rear section 18b. The cutoff saw 10 is modular with respect to the saw motor 26 in that the rear section 18b of the table 18 includes a channel 30 which receives a bracket 34 that bolts to the rear section 18b of the table 18 and to the saw motor 26. The bracket 34 forms the pivot for cutting with the saw motor 26. Various different brackets 34 may be made to accommodate saw motors 26 from different companies and use the same with the saw base 14 as shown.

A primary, blade receiving slot 38 is formed in the table 18 (in both halves 18a and 18b of the table as shown) which receives the saw blade 26b when cutting with the saw 10. Additionally, secondary slots 42 are formed adjacent the sides of the slot 38. Air flows through the slot 38 and slots 42 and into the base 14 to capture dust created by the saw 10.

Figure 2:
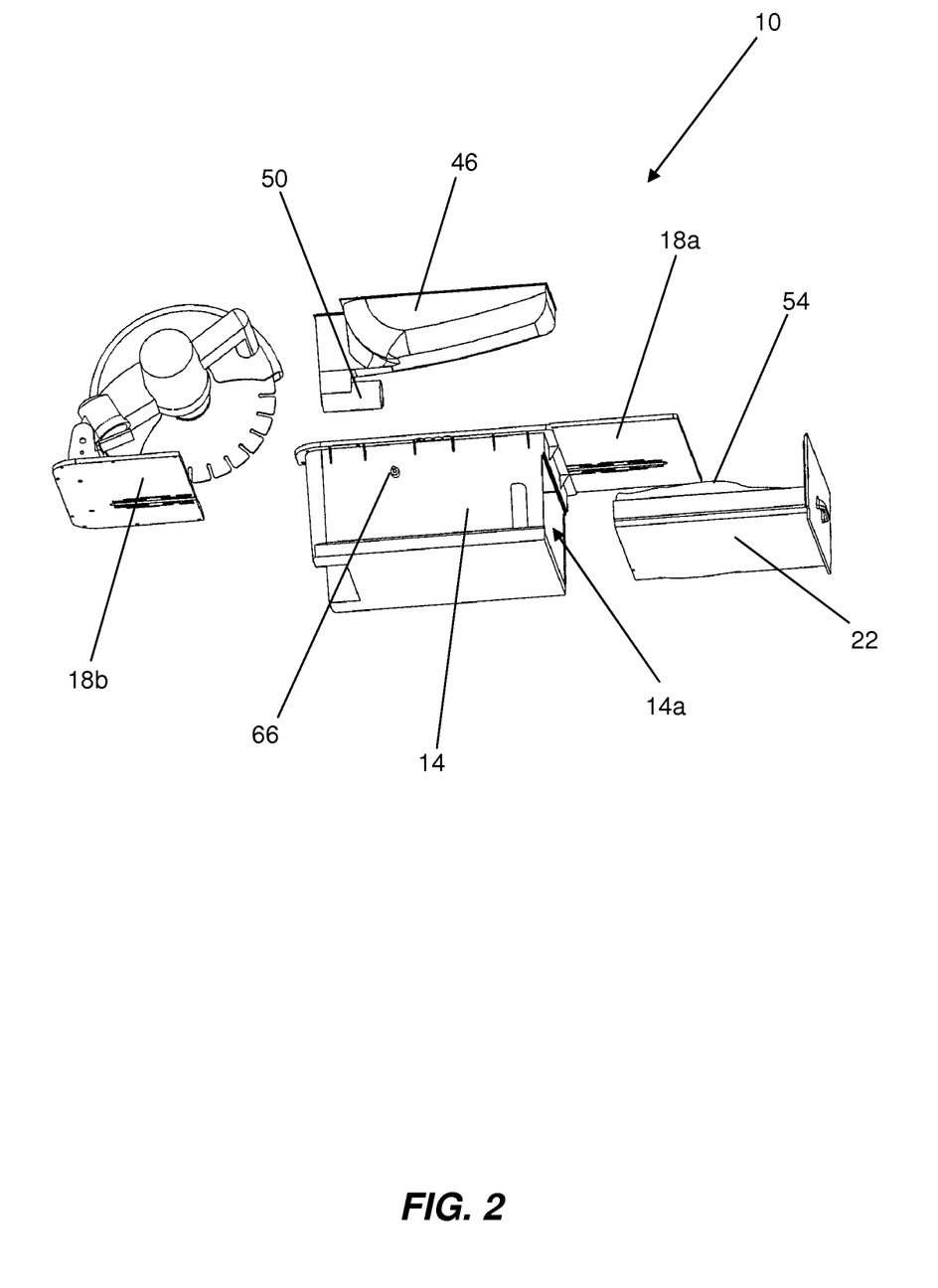
FIG. 2 shows a partially disassembled perspective view of the saw of FIG. 1.
Figure 3:
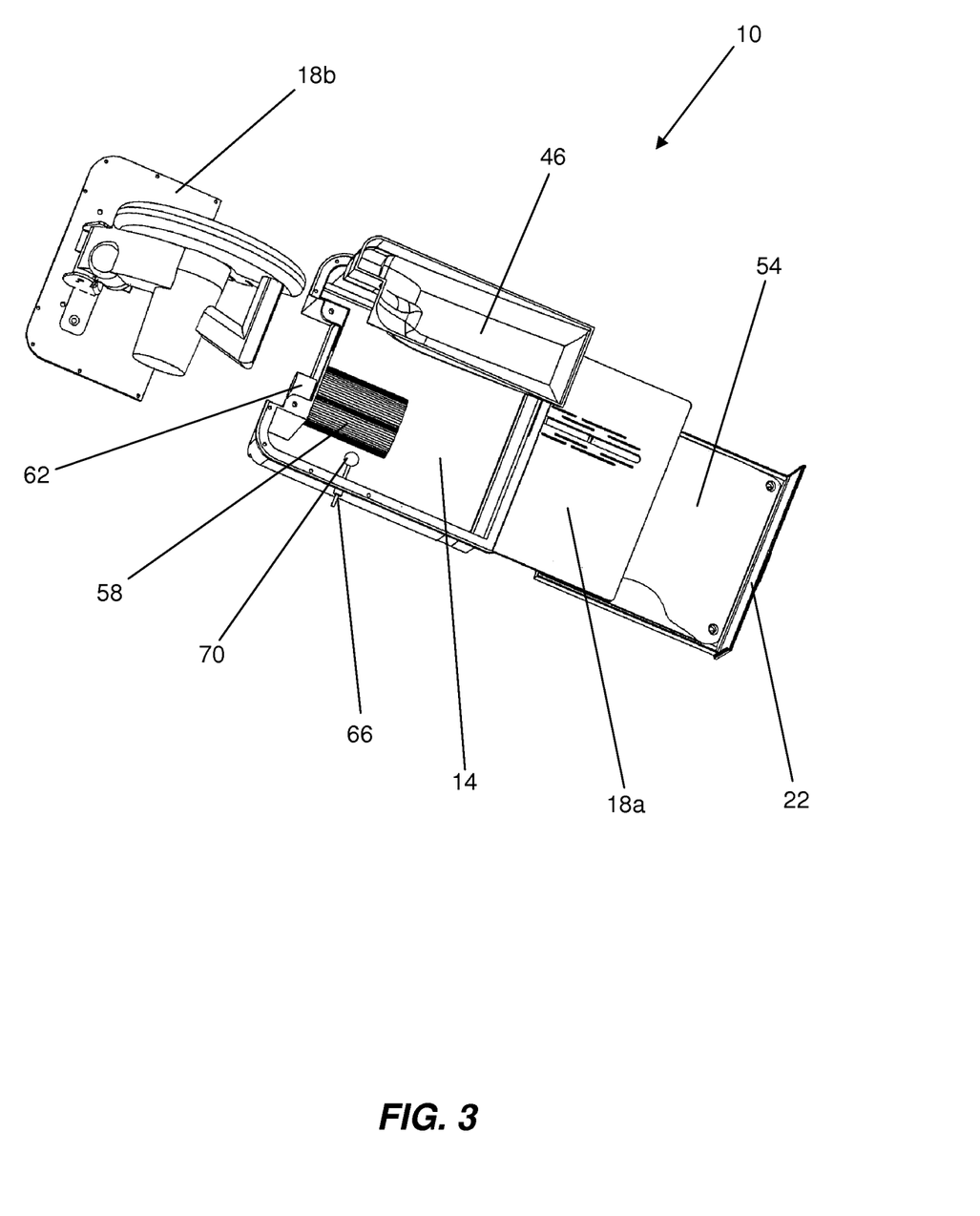
FIG. 3 shows another partially disassembled perspective view of the saw of FIG. 1.

FIGS. 2 and 3 show partially exploded views of the saw 10 and illustrate additional aspects of the dust collection system. FIG. 2 shows a bottom view of the saw 10 and FIG. 3 shows a top view. A dust collection plenum 46 is located in the base 14 just below the table, and typically seals against the bottom of the table 18 so that air flows into the top of the plenum 46 through the slots 38 and 42. The plenum 46 captures the dust created when cutting with the saw and directs the dust through a port 50 formed at the bottom of the plenum. The plenum is enclosed except for the open top and the port 50. The plenum 46 is shallower in the front and deeper in the back in order to help direct dust towards the back and to the port 50. The front section 18a of the table 18 is easily removable to access the plenum 46 to clean or service the plenum. During use of the saw, some pieces of cut material may lodge in the front of the plenum 46 and require that the user remove the front of the table 18a and manually remove the debris.

A filter drawer 22 fits into an opening 14a in the front of the base 14. A filter bag 54 is secured to the filter drawer 22. The filter bag 54 is made of a porous filter cloth, such as a spun bonded plastic material, and is enclosed except for an opening in the back that is aligned with the plenum port 50 so that, when the drawer is closed, the filter bag opening seals around the port 50. The filter bag 54 is typically secured to the filter drawer 22 with screws or clips to hold it in place during use. The drawer 22 is easily removed from or placed into the base 14 to service the filter.

Visible in FIG. 3 is a cylindrical canister filter 58. The canister filter 58 is typically a pleated filter similar to those used in canister vacuums. The canister filter 58 is attached to an exhaust port 62 on the back wall of the base 14, but could also be attached to another wall. In use, a vacuum or a lower motor is attached to the exhaust port 62 and draws air through the slots 38, 42 and into the plenum 46, through the plenum port 50, into the filter bag 54 (where the majority of the dust and debris is captured, through the filter bag, through the canister filter 58, and out the exhaust port 62 and into the vacuum. Alternatively, the saw 10 may use an integral motor and fan, typically attached to or in place of the exhaust port 62, to draw air through the table and collect dust in the same manner. In such a situation, the exhaust port 62 would typically be replaced by a motor and fan which draws air through the canister filter 58 and out of the base 14. Such a motor and fan would typically be synced to the saw motor 26 so that the fan motor starts when the saw motor starts.

The base 14 is formed with a filter knock rod 66. The knock rod 66 is formed with a blunt end 70 placed adjacent the canister filter 58. The knock rod 66 is spring loaded so that, when the vacuum is off, a user may pull the rod away from the filter 58 and releases the rod, causing the spring to hit the knock rod against the filter 58. This shakes the filter and causes dust and debris to fall off of the filter. This may be performed periodically when using the saw 10 to prevent the filter from becoming clogged and to prevent against the loss of air flow and corresponding loss of debris collection. The knock rod 66 allows a user to quickly clean the filter 58 without removing the filter; extending the time a user may use the saw without changing or cleaning the filter.

Figure 4:
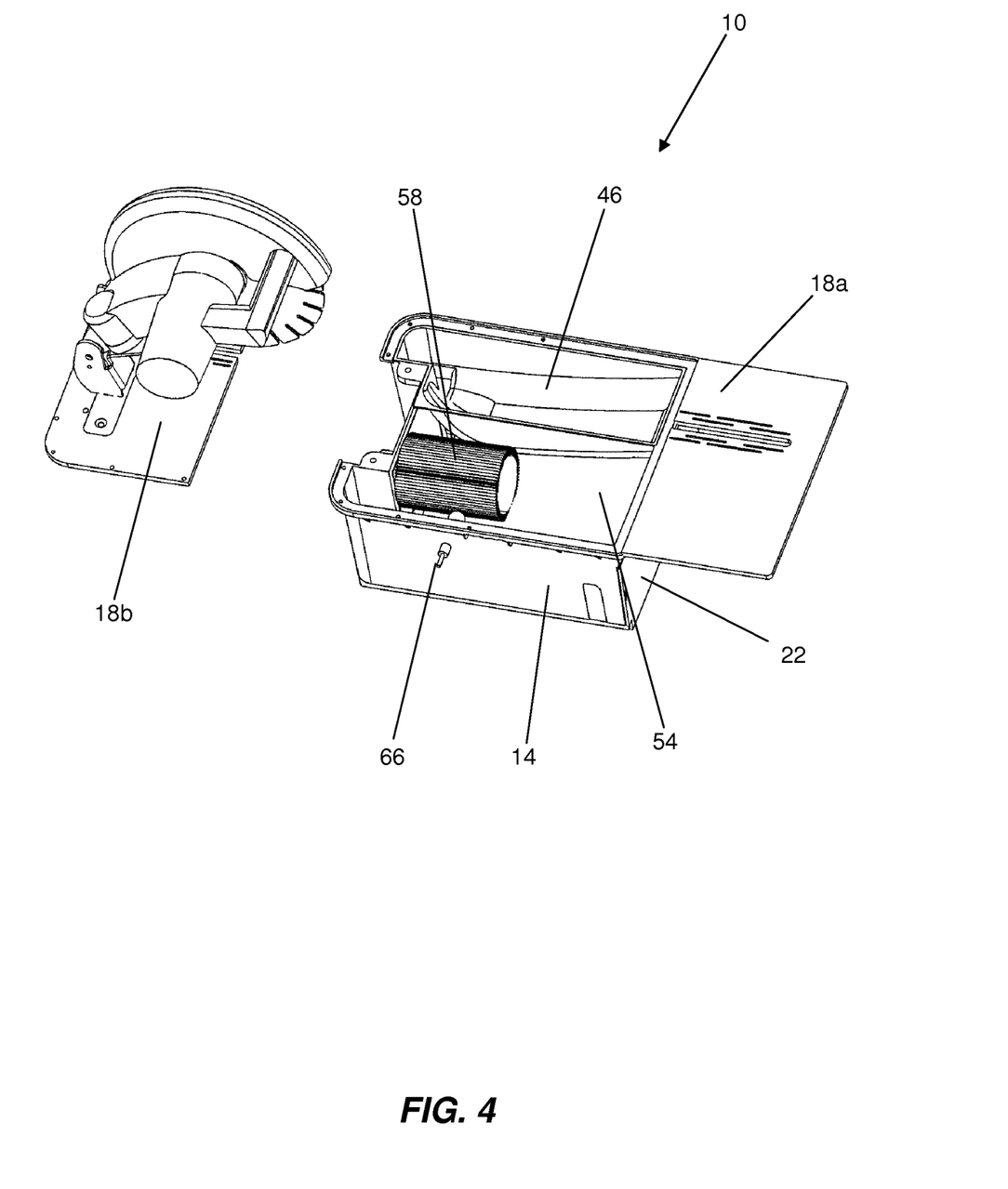
FIG. 4 shows another partially disassembled perspective view of the saw of FIG. 1.

FIG. 4 shows the plenum 46 and canister filter 58 in place in the saw 10, and illustrates the layout of components therein. The plenum 46 is secured to the base 14, and extends upwardly to seal against the table 18. According to a preferred embodiment, the drawer 22 and filter bag 54 occupy approximately the lower third or half of the base 14. The saw blade 26b is offset towards the right side of the table 18, locating the plenum 46 in the right side of the base 14. The canister filter 58 is located in the left side of the base. When necessary, the filter 58 may be easily changed by removing the front table section 18a, rear table section 18b, or the filter drawer 22.

Figure 5:
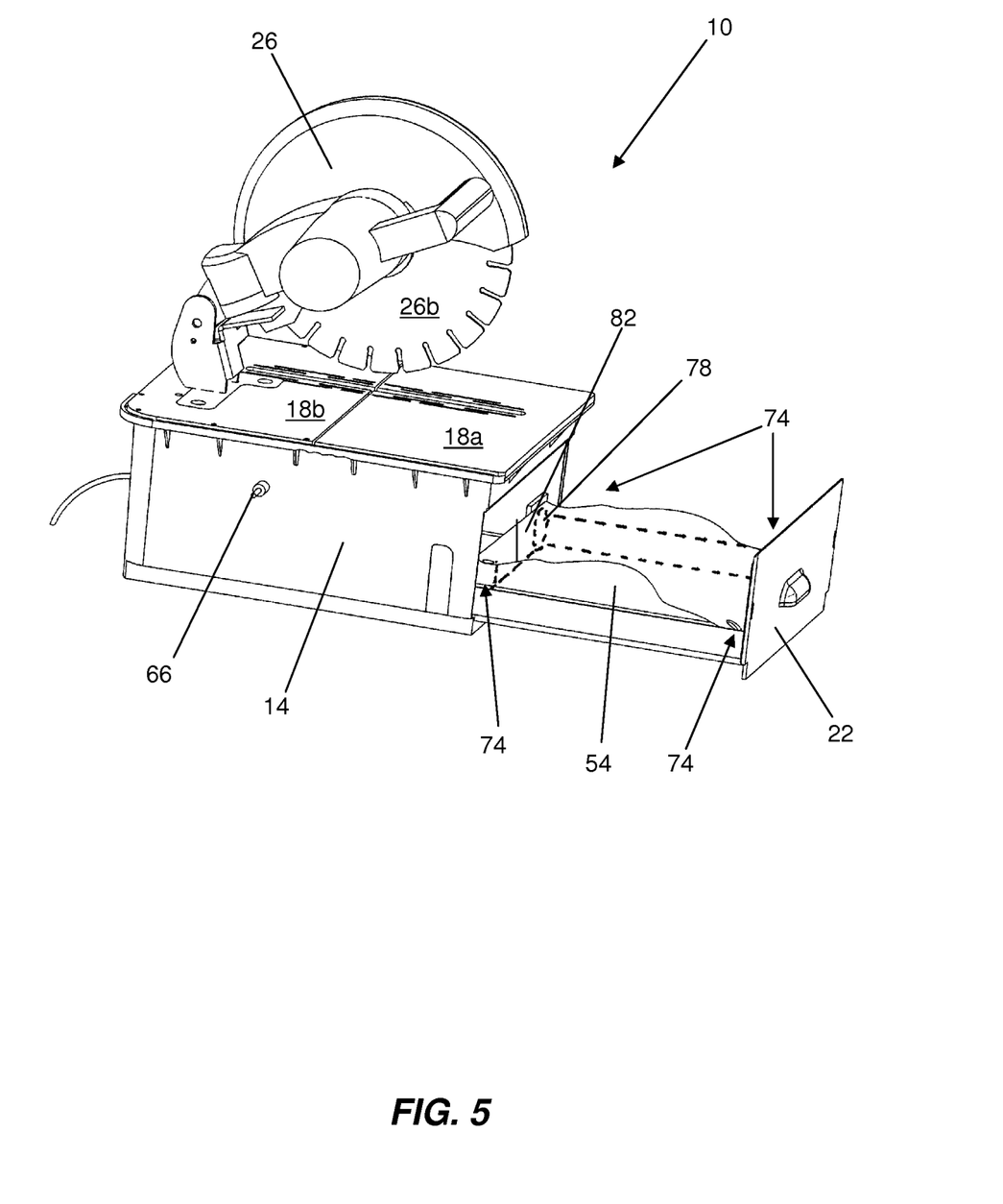
FIG. 5 shows another perspective view of the saw of FIG. 1.

FIG. 5 shows the filter drawer 22 and filter bag 54 in greater detail. Typically, the corners 74 of the filter bag 54 are secured to the drawer 22. Securing the corners 74 of the filter bag 54 makes it easer to install and remove the drawer 22, ensures a good seal with the plenum port 50, and keeps the filter bag 54 in place during operation. The filter bag 54 includes an inlet opening 78 which mates with the plenum port 50. The inlet opening 78 is typically formed by an inlet plate 82 that is attached to the filter media forming the bag 54 and a rubber seal which extends around the opening 78 to seal against the plenum port 50. The inlet plate 82 is typically attached to the drawer 22, such as with a bracket or by attachment with the corner of the filter bag 54, to hold the inlet plate 82 in place and seal the inlet opening 78 against the plenum port 50 as the drawer 22 is closed.

The saw 10 is thus provided with multiple stages of filtration. The filter bag 54 provides a long service life and captures a majority of the debris. The filter bag 54 has a large filter area, and typically does not significantly obstruct flow before the filter bag becomes full. The canister filter 58 captures any fine dust not collected by the filter bag 54, and may be periodically cleaned with the knock rod 66 without requiring any significant down time. The canister filter does not become quickly clogged and restrict air flow because the filter bag 54 captures a majority of the debris before it reaches the canister filter. The vacuum used to draw air through the saw 10 provides a final filtration stage for any debris that exits the exhaust port 62. The filter bag 54 and canister filter 58 provide adequate filtration even if the base 14 is used with an integral motor and fan rather than a vacuum.

Figure 6:
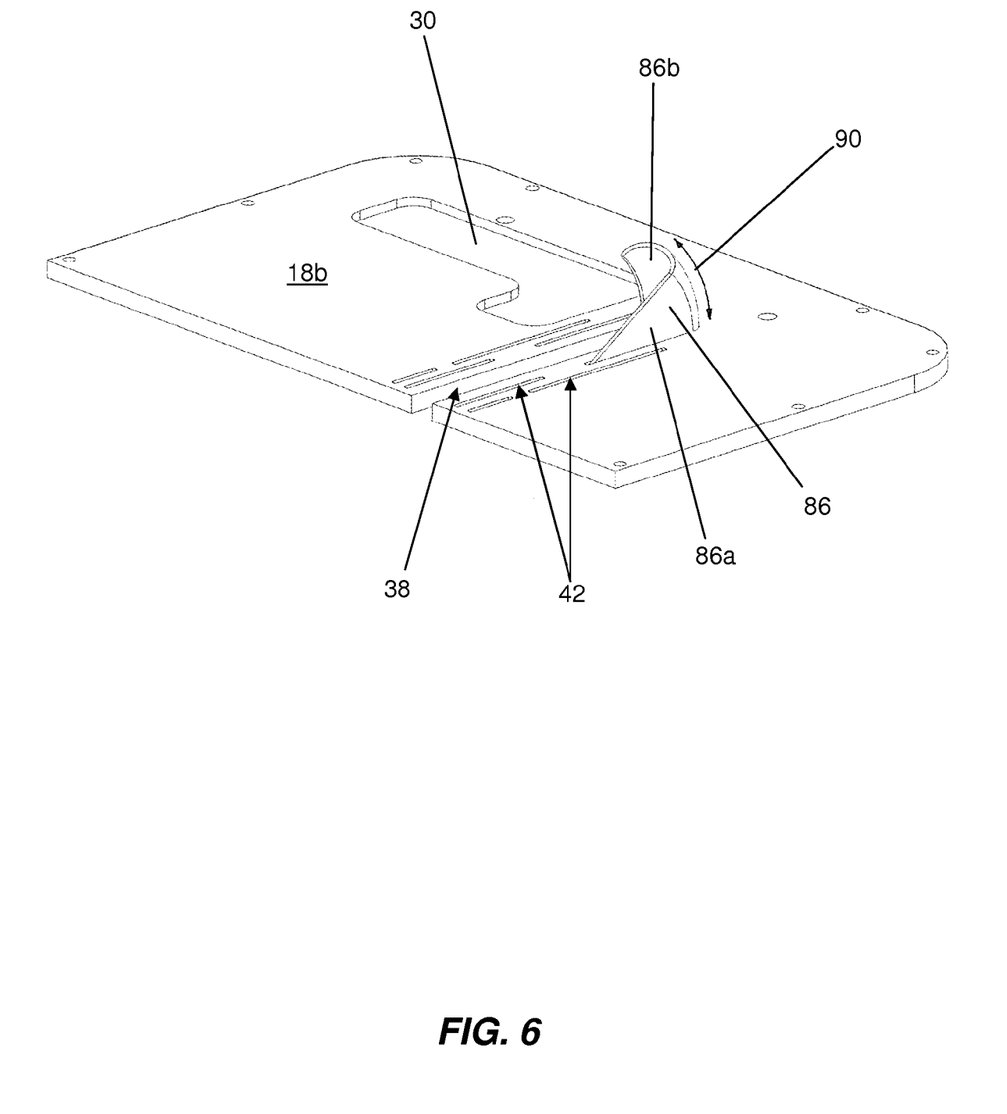
FIG. 6 shows a perspective view of the rear portion of the table of the saw of FIG. 1.
Figure 7:
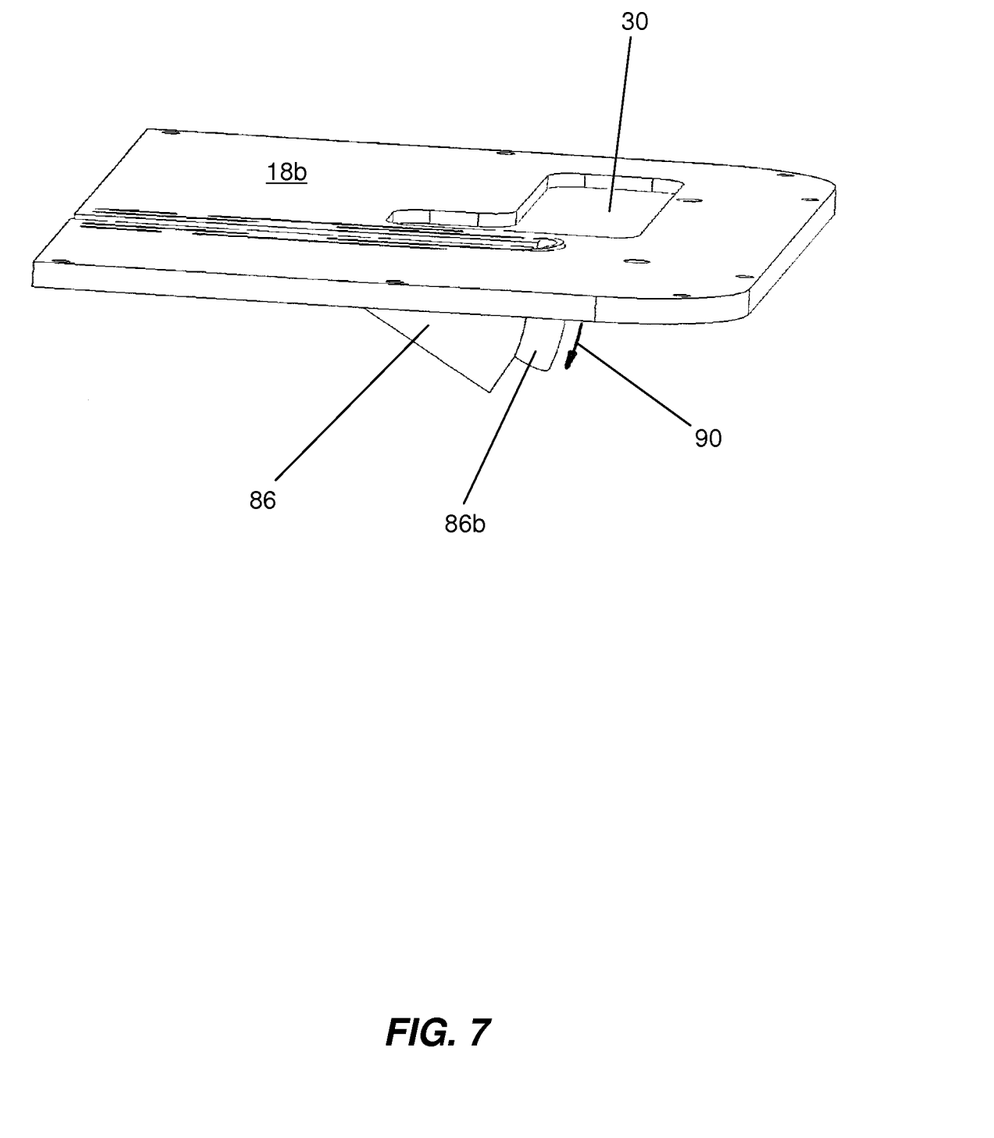
FIG. 7 shows another perspective view of the rear portion of the table of FIG. 1.

FIG. 6 shows a perspective view of the rear table portion 18b. The channel 30 for mounting the saw motor bracket 34 can be better seen. Also illustrated is a dust deflector 86. The dust deflector 86 includes a side plate 86a located on the right side of the blade channel 38 (as seen by a saw user) and a curved rear channel 86b. The curved rear channel 86b is formed to curve forward on both sides of the slot 38 and thereby funnel dust and debris which is thrown backwards from the saw blade into the slot 38 for collection. The deflector 86 is pivotably mounted to the table section 18b near the front of the deflector and can pivot down into the table as shown by arrow 90. FIG. 7 shows the deflector as pivoted in the down position. The deflector 86 is spring biased into the up position shown in FIG. 6.

Typically, the saw 10 is used in two ways. The saw blade and motor 26 can be pivoted down to cut through wood, brick, or the like. Alternatively, the motor 26 can be locked into the down position and a thin piece of material such as flooring tile may be slid across the table and through the blade to cut the tile similar to a tile saw. When the saw motor 26 is locked down and a tile is moved through the blade to cut, the majority of the dust and debris is carried down through the slot 38 with the blade. The deflector 86 pivots down into the table 18 when a tile or other item slides over the deflector as the tile is being cut.

When the saw motor 26 is lowered to cut through a brick or piece of wood, however, the blade is cutting through the top surface of the item being cut and much of the debris is thrown backwards by the blade. The deflector 86 catches the dust and debris which is thrown backwards by the blade and aids in the collection thereof. The curved rear portion 86b of the deflector guides the debris to the center of the deflector (which is aligned with the slot 38) and downwardly into the slot. The airflow through the slots 38, 42 and into the plenum 46 draws the dust and debris into the slots. Thus, the deflector plate 86 improves the collection of dust and debris without interfering with the use of the saw 10.

The saw 10 is advantageous as it provides improved dust filtration as well as extended service life. Cutoff saws have previously proved difficult to achieve effective dust collection because of the large quantity of dust and debris. Prior art collection systems have suffered from poor collection and from filters which become quickly clogged, requiring frequent downtime to remove and replace filters.

There is thus disclosed an improved cutoff saw and dust collection system. It will be appreciated that numerous changes may be made to the present invention without departing from the scope of the claims.

What is claimed is:

1. A cutoff saw dust collection system comprising:
    a base;
    a table attached to the top of the base;
    a saw motor assembly pivotably attached to a back of the table and disposed above the table, the saw motor assembly having an arm extending forwards, a motor, a saw blade and a blade guard;
    a blade slot in the table aligned with the blade for receiving the blade therethrough, the blade slot having a back disposed adjacent to the back of the table and a front disposed away from the back of the table;
    a dust deflector attached to the table adjacent the back of the blade slot and extending upwardly from the surface of the table for directing dust through the blade slot, and wherein the dust deflector is pivotably mounted to the table such that the dust deflector is pivotable downwardly through a deflector slot in the table and wherein the dust deflector is biased to pivot upwardly to extend above the table.

2. The system of claim 1, wherein the dust deflector directs dust through the blade slot and into a plenum, the plenum being attached to the bottom of the table.

3. The system of claim 2, wherein dust is directed out of the base and into a vacuum.

4. The system of claim 2, further comprising a filter cloth, said filter cloth defining a debris collection chamber, and wherein dust moves out of the plenum, through a plenum port, and into said debris collection chamber.

5. The system of claim 4, wherein said debris collection chamber is defined by a filter bag.

6. The system of claim 4, wherein said filter cloth is attached to a drawer which is extendable from the base to thereby empty the debris collection chamber.

7. The system of claim 4, further comprising a canister filter, and wherein air flows through the blade slot, into the plenum, into the debris collection chamber, through the filter cloth, through the canister filter, and out of the base.

8. The system of claim 2, further comprising a canister filter, and wherein air flows through the blade slot, into the plenum, through the canister filter, and out of the base.

9. The system of claim 1, wherein the dust deflector has a side plate generally parallel to the saw blade and a curved rear channel attached to the side plate and extending behind the blade, the curved rear channel extending upwardly and forwards from the table.

10. The system of claim 1, wherein the dust deflector passes through the table between a first position where the dust deflector extends above the surface of the table and a second position where the dust deflector is disposed beneath the surface of the table.

11. A cutoff saw dust collection system comprising:
    a base;
    a table attached to the top of the base;
    a blade slot formed through the table for receiving a saw blade therethrough;
    a saw motor and saw blade mounted above the table adjacent a back of the table such that the saw motor is pivotable down towards the table to cut an object; and
    a dust deflector attached to the table via a pivot which is disposed beneath the table such that the dust deflector is disposed adjacent a back of the blade slot to direct dust from the saw blade through the blade slot and into the base, the dust deflector being movable through an opening in the table upwardly to a first position above the table and downwardly to a second position beneath the table.

12. The system of claim 11, wherein the dust deflector moves through a deflector slot formed in the table to pivot between the first position where the dust deflector is disposed above the table and the second position where the dust deflector is disposed below the surface of the table.

13. The system of claim 12, further comprising a biasing member attached to the dust deflector and the table to bias the dust deflector upwardly into the first position.

14. The system of claim 12, wherein a front edge of the dust deflector is angled upwardly relative to an upper surface of the table such that sliding an object rearwardly along the table against the dust deflector pushes the dust deflector beneath the table into the second position.

15. The system of claim 11, wherein the dust deflector comprises a side plate extending parallel to the blade slot and a curved rear channel which curves around a back of the blade slot.

16. The system of claim 11, wherein a front edge of the dust deflector is angled upwardly relative to an upper surface of the table such that sliding an object rearwardly across the surface of the table against the dust deflector pushes the dust deflector downwardly into the second position.

17. The system of claim 11, further comprising a biasing element attached to the dust deflector and the table to bias the dust deflector upwardly to the first position.

18. The system of claim 11, wherein the dust deflector comprises a curved rear channel which curves around a back of the blade slot and which is angled forwardly relative to the table to deflect dust downwardly and through the blade slot.

19. The system of claim 18, wherein the dust deflector further comprises a side plate attached to the rear channel, the side plate extending forward from the rear channel and upwardly from an upper surface of the table in a direction parallel to the blade slot.

\* \* \* \* \*